(12) United States Patent
Sumimura et al.

(10) Patent No.: US 10,343,539 B2
(45) Date of Patent: Jul. 9, 2019

(54) POWER SUPPLY DEVICE FOR SUPPLYING ELECTRICITY TO A LOAD UTILIZING ELECTRIC POWER OF A STORAGE-BATTERY-EQUIPPED VEHICLE

(71) Applicant: NICHICON CORPORATION, Kyoto-shi, Kyoto (JP)

(72) Inventors: Hiroyuki Sumimura, Kyoto (JP); Shigeo Ohkuma, Kyoto (JP); Yuki Katayama, Kyoto (JP)

(73) Assignee: NICHICON CORPORATION, Kyoto-shi, Kyoto (JP)

( * ) Notice: Subject to any disclaimer, the term of this patent is extended or adjusted under 35 U.S.C. 154(b) by 106 days.

(21) Appl. No.: 15/532,771

(22) PCT Filed: Aug. 29, 2016

(86) PCT No.: PCT/JP2016/075168
§ 371 (c)(1),
(2) Date: Jun. 2, 2017

(87) PCT Pub. No.: WO2017/038753
PCT Pub. Date: Mar. 9, 2017

(65) Prior Publication Data
US 2017/0334305 A1 Nov. 23, 2017

(30) Foreign Application Priority Data
Aug. 31, 2015 (JP) .................. 2015-170791

(51) Int. Cl.
*B60L 11/18* (2006.01)
*H01M 10/44* (2006.01)
(Continued)

(52) U.S. Cl.
CPC .......... *B60L 11/1842* (2013.01); *B60L 53/60* (2019.02); *B60L 55/00* (2019.02); *B60L 58/12* (2019.02);
(Continued)

(58) Field of Classification Search
CPC .............. B60L 11/1842; B60L 11/1838; B60L 11/1861; B60L 11/1816; H01M 10/48; H01M 10/44; H02J 7/00
(Continued)

(56) References Cited

U.S. PATENT DOCUMENTS 7,847,518 B2 * 12/2010 Ichikawa .............. B60L 11/123
320/109
8,019,483 B2   9/2011 Keefe
(Continued)

FOREIGN PATENT DOCUMENTS

JP  2011-135727 A  7/2011
JP  2011-182497 A  9/2011
(Continued)

OTHER PUBLICATIONS

Machine Translation of JP 2011135727.*
European Search Report dated May 25, 2018 of corresponding European application EP16841785.5.

*Primary Examiner* — Robert J Grant
*Assistant Examiner* — John T Trischler
(74) *Attorney, Agent, or Firm* — Muncy, Geissler, Olds & Lowe, P.C.

(57) ABSTRACT

A power supply device including vehicle connecting portions, a load connecting portion, a power supply portion, a memory portion for storing the number of charges and discharges for each storage-battery-equipped vehicle, and a supply control portion for performing control such that the power supply portion performs a discharge operation only (Continued)

on a selected supply vehicle. The supply control portion selects as the supply vehicle one of the storage-battery-equipped vehicles that satisfies a first condition that an SOC of a storage battery is greater than or equal to a prescribed value and a second condition that the number of charges and discharges is not the highest among the storage-battery-equipped vehicles.

4 Claims, 4 Drawing Sheets

(51) Int. Cl.
*H01M 10/48* (2006.01)
*H02J 7/00* (2006.01)
*B60L 53/60* (2019.01)
*B60L 55/00* (2019.01)
*B60L 58/12* (2019.01)

(52) U.S. Cl.
CPC ............ *H01M 10/44* (2013.01); *H01M 10/48* (2013.01); *H02J 7/00* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
USPC ........................................................ 320/109
See application file for complete search history.

(56) References Cited

U.S. PATENT DOCUMENTS

| | | | | |
|---|---|---|---|---|
| 8,049,359 B2* | 11/2011 | Kinser | B60L 1/003 | 307/9.1 |
| 8,054,039 B2* | 11/2011 | Bauerle | B60L 3/003 | 320/109 |
| 8,183,819 B2* | 5/2012 | Sugano | B60L 3/003 | 307/10.1 |
| 8,207,740 B2* | 6/2012 | Lin | H01M 10/441 | 180/207.3 |
| 8,373,389 B2* | 2/2013 | Badger | B60L 11/1818 | 180/65.1 |
| 8,710,800 B2* | 4/2014 | Gibbs | H01M 10/441 | 320/116 |
| 8,760,115 B2* | 6/2014 | Kinser | B60L 1/003 | 180/65.29 |
| 8,781,675 B2* | 7/2014 | Yoshida | B60T 1/10 | 180/65.28 |
| 8,907,629 B2* | 12/2014 | Kelty | B60L 11/187 | 320/132 |
| 8,912,753 B2* | 12/2014 | Pudar | B60L 11/1816 | 320/109 |
| 8,970,173 B2* | 3/2015 | Kelty | B60L 11/187 | 320/132 |
| 8,994,329 B2* | 3/2015 | Ohkuma | H01M 10/44 | 180/65.1 |
| 9,071,058 B2* | 6/2015 | Oku | H02J 7/0029 | |
| 9,219,381 B2* | 12/2015 | Goto | H01M 10/441 | |
| 9,233,615 B2* | 1/2016 | Matsuda | B60L 11/18 | |
| 9,238,416 B2* | 1/2016 | Alford | B60L 11/1824 | |
| 9,242,571 B2* | 1/2016 | Fukui | H02J 7/0004 | |
| 9,266,438 B2* | 2/2016 | Power | B60L 11/1809 | |
| 9,340,117 B2* | 5/2016 | Momose | B60L 11/1838 | |
| 9,347,784 B2* | 5/2016 | Inoue | B60L 11/1838 | |
| 9,367,052 B2* | 6/2016 | Steven | G06Q 50/06 | |
| 9,481,258 B2* | 11/2016 | Niizuma | B60L 5/005 | |
| 9,731,615 B2* | 8/2017 | Uyeki | B60L 11/1842 | |
| 9,751,413 B2* | 9/2017 | Im | B60L 11/1816 | |
| 9,919,609 B2* | 3/2018 | Kretschmer | B60L 11/1818 | |
| 9,987,940 B2* | 6/2018 | Uyeki | B60L 11/1842 | |
| 10,040,364 B2* | 8/2018 | Nishi | B60L 11/1844 | |
| 10,093,193 B2* | 10/2018 | Ohkuma | H02J 7/0027 | |
| 10,099,565 B2* | 10/2018 | Spesser | H02J 7/0029 | |
| 2005/0141154 A1* | 6/2005 | Consadori | B60R 16/023 | 361/62 |
| 2009/0115251 A1* | 5/2009 | Nakamura | H01M 10/625 | 307/32 |
| 2009/0210357 A1* | 8/2009 | Pudar | B60L 11/1816 | 705/412 |
| 2009/0315512 A1* | 12/2009 | Ichikawa | B60L 11/123 | 320/109 |
| 2010/0079004 A1* | 4/2010 | Keefe | B60L 11/1842 | 307/80 |
| 2010/0082277 A1* | 4/2010 | Ballard | B60L 11/1809 | 702/63 |
| 2010/0321025 A1* | 12/2010 | Lin | H01M 10/4207 | 324/427 |
| 2011/0043165 A1* | 2/2011 | Kinser | B60L 1/003 | 320/109 |
| 2011/0089758 A1* | 4/2011 | Kinser | B60L 1/003 | 307/10.1 |
| 2011/0181241 A1* | 7/2011 | Badger | B60L 11/1818 | 320/109 |
| 2012/0293108 A1* | 11/2012 | Goto | H01M 10/441 | 320/101 |
| 2013/0020993 A1* | 1/2013 | Taddeo | H02J 7/0027 | 320/109 |
| 2013/0026989 A1* | 1/2013 | Gibbs | H01M 10/441 | 320/116 |
| 2013/0035823 A1* | 2/2013 | Yoshida | B60T 1/10 | 701/31.5 |
| 2013/0175974 A1* | 7/2013 | Bassham | B60L 11/1837 | 320/106 |
| 2013/0184882 A1* | 7/2013 | Momose | B60L 11/1838 | 700/286 |
| 2013/0204443 A1* | 8/2013 | Steven | G06Q 50/06 | 700/286 |
| 2013/0221916 A1* | 8/2013 | Kelty | B60L 11/187 | 320/109 |
| 2013/0221928 A1* | 8/2013 | Kelty | B60L 11/187 | 320/134 |
| 2013/0335024 A1* | 12/2013 | Akai | H01M 10/44 | 320/109 |
| 2014/0049218 A1* | 2/2014 | Morand | H02J 7/04 | 320/109 |
| 2014/0152099 A1* | 6/2014 | Boyd | H02J 7/0052 | 307/23 |
| 2014/0292271 A1* | 10/2014 | Ohkuma | H01M 10/44 | 320/109 |
| 2014/0320062 A1* | 10/2014 | Murayama | B60L 11/1844 | 320/104 |
| 2014/0347017 A1* | 11/2014 | Sugano | B60L 1/003 | 320/137 |
| 2014/0361732 A1 | 12/2014 | Nishikawa et al. | | |
| 2015/0022141 A1* | 1/2015 | Oku | H02J 7/0029 | 320/107 |
| 2015/0048792 A1* | 2/2015 | Alford | B60L 11/1824 | 320/109 |
| 2015/0147918 A1* | 5/2015 | Matsuda | B60L 11/18 | 439/694 |
| 2015/0251547 A1* | 9/2015 | Nonomura | B60L 11/1816 | 320/109 |
| 2015/0258910 A1* | 9/2015 | Fukui | H02J 7/0004 | 701/22 |
| 2015/0308848 A1* | 10/2015 | Inoue | B60L 11/1838 | 701/521 |
| 2015/0314699 A1* | 11/2015 | Wakasugi | B60L 7/14 | 307/9.1 |
| 2016/0039297 A1* | 2/2016 | Kretschmer | B60L 11/1818 | 320/109 |
| 2016/0059719 A1* | 3/2016 | Jung | B60L 11/1818 | 320/109 |
| 2016/0059731 A1* | 3/2016 | Jung | B60L 11/1818 | 320/109 |

(56) References Cited

U.S. PATENT DOCUMENTS

| | | | |
|---|---|---|---|
| 2016/0075244 A1* | 3/2016 | Im | B60L 11/1816 |
| | | | 320/107 |
| 2016/0075247 A1* | 3/2016 | Uyeki | B60L 11/1842 |
| | | | 455/456.3 |
| 2016/0280089 A1* | 9/2016 | Uyeki | B60L 11/1842 |
| 2016/0318412 A1* | 11/2016 | Alford | B60L 11/1824 |
| 2017/0028861 A1* | 2/2017 | Spesser | H02J 7/0029 |
| 2017/0182900 A1* | 6/2017 | Ohkuma | B60L 11/1844 |
| 2017/0182902 A1* | 6/2017 | Katayama | B60L 11/18 |
| 2017/0217326 A1* | 8/2017 | Nishi | B60L 11/1844 |
| 2018/0009330 A1* | 1/2018 | Ricci | H04L 9/321 |
| 2018/0012197 A1* | 1/2018 | Ricci | H04L 9/321 |
| 2018/0229615 A1* | 8/2018 | Shumaker | B60L 11/1818 |
| 2018/0244165 A1* | 8/2018 | Anma | B60L 11/1816 |

FOREIGN PATENT DOCUMENTS

| | | |
|---|---|---|
| JP | 2013-172488 A | 9/2013 |
| JP | 2013-179729 A | 9/2013 |
| JP | 2013198372 A | 9/2013 |
| JP | 2014-064457 A | 4/2014 |
| JP | 2015023712 A | 2/2015 |

\* cited by examiner

[FIG. 1]
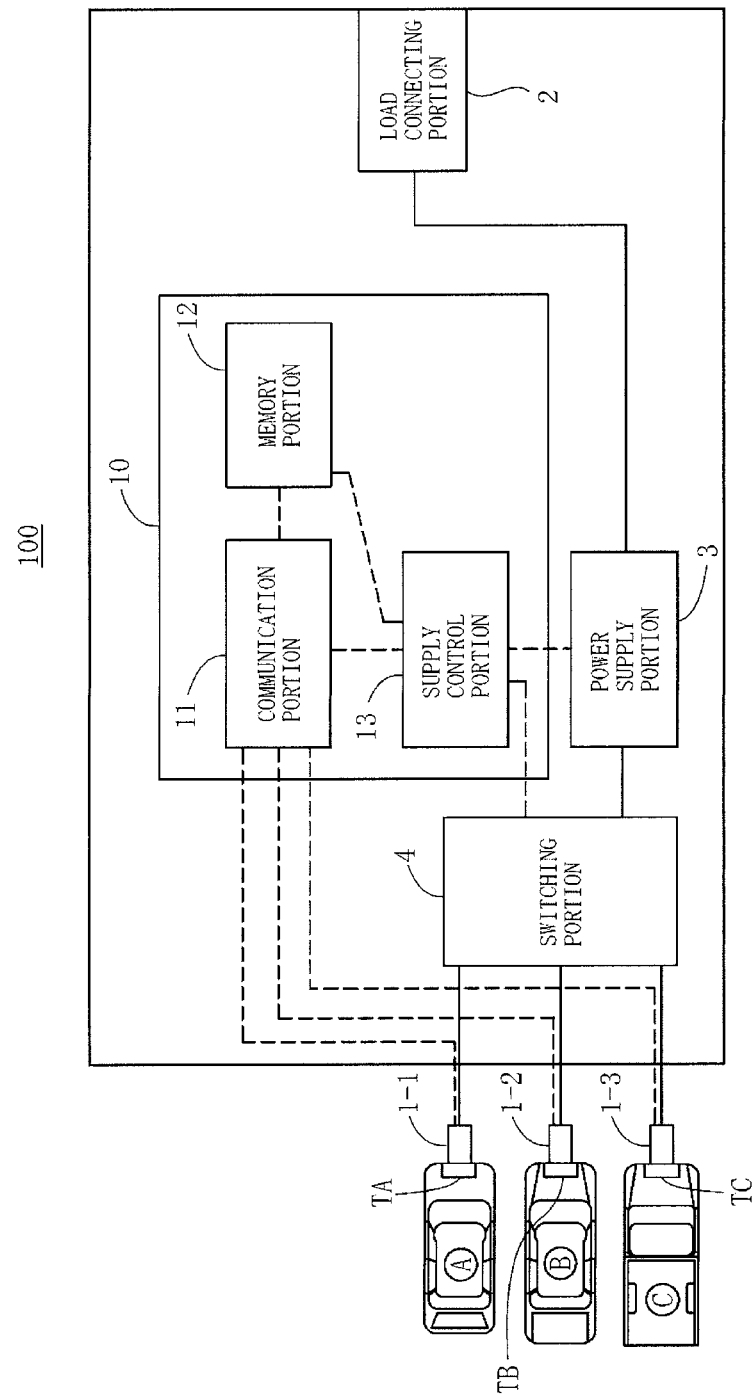

[FIG. 2]
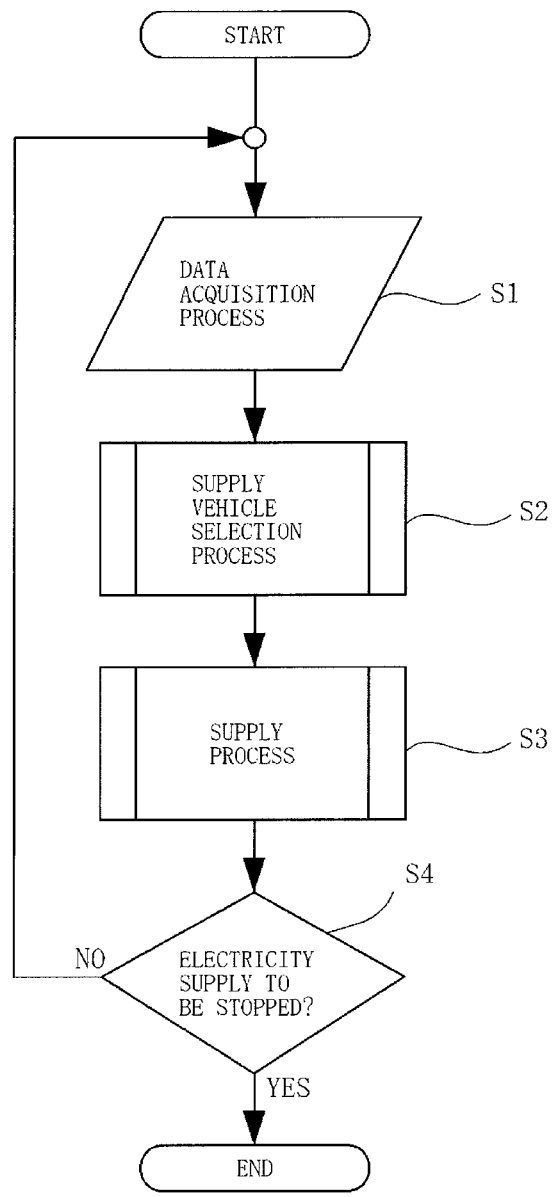

[FIG. 3]
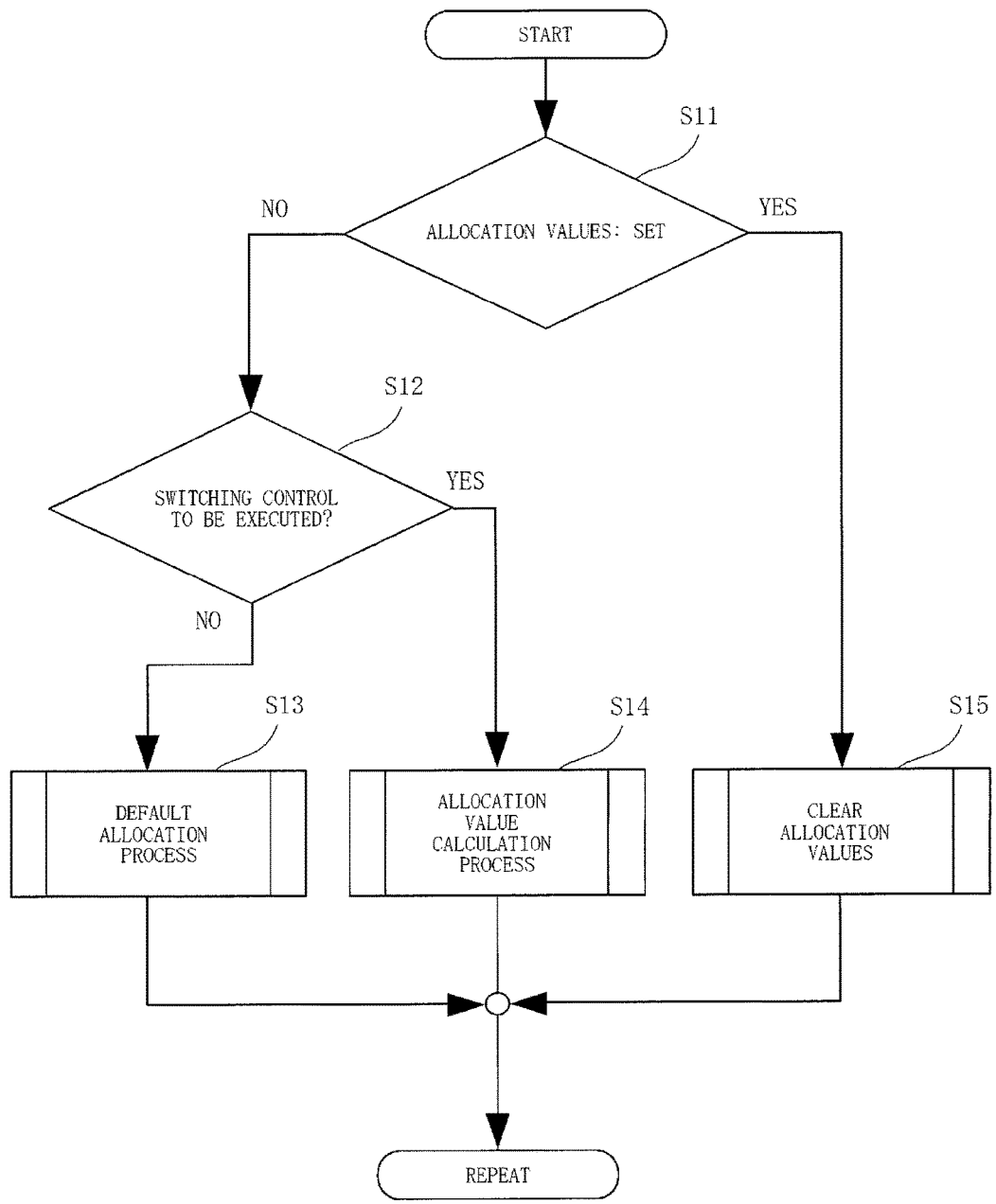

[FIG. 4]
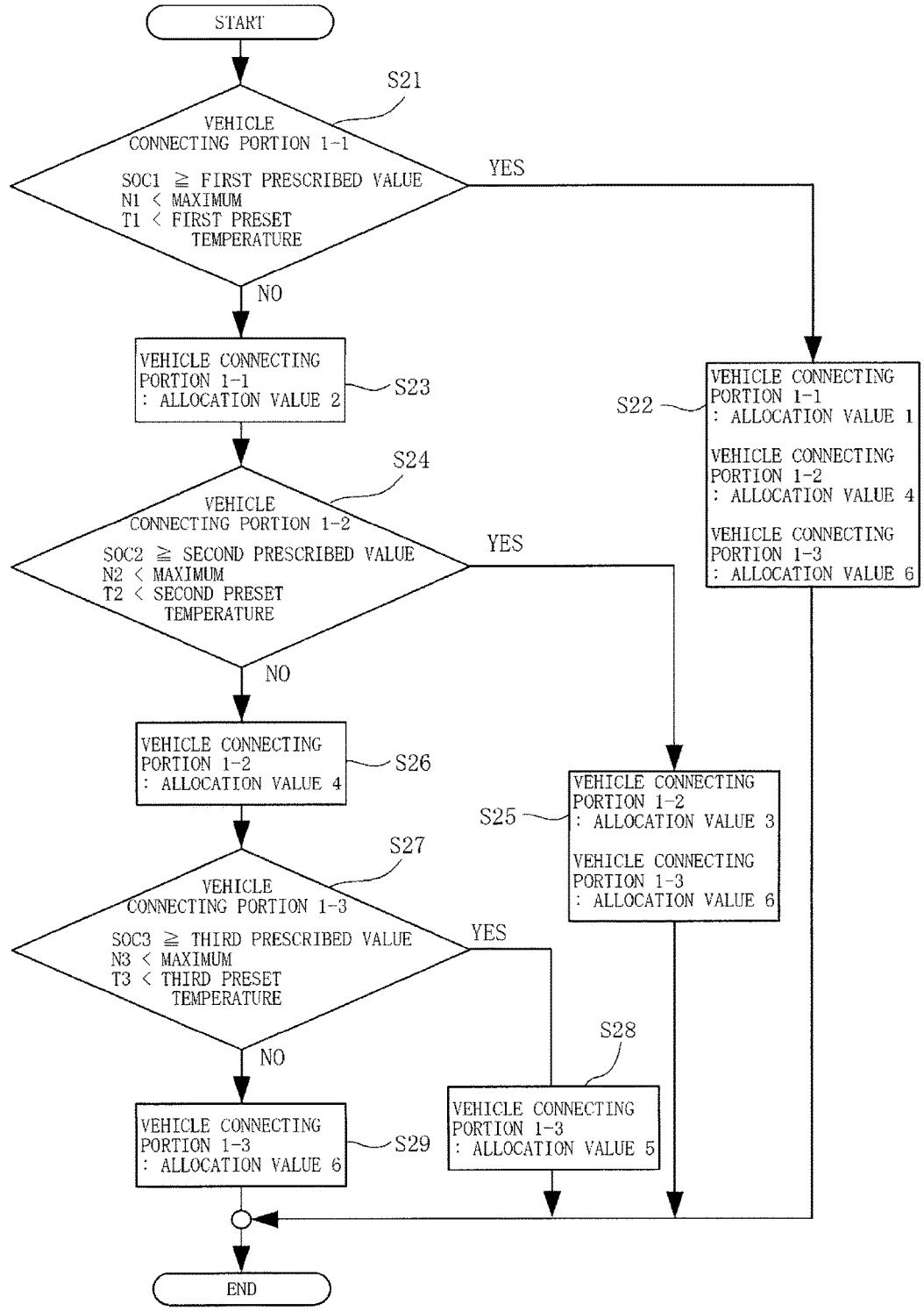

POWER SUPPLY DEVICE FOR SUPPLYING ELECTRICITY TO A LOAD UTILIZING ELECTRIC POWER OF A STORAGE-BATTERY-EQUIPPED VEHICLE

This application is a National Stage of International Application No. PCT/JP2016/075168, filed on Aug. 29, 2016, which claims priority to Application No. 2015-170791 filed in Japan on Aug. 31, 2015, the entire contents of all of which are hereby incorporated by reference.

TECHNICAL FIELD

The present invention relates to a power supply device for supplying electricity to a load utilizing the electric power of a storage-battery-equipped vehicle.

BACKGROUND ART

An example of a known power supply device for supplying electricity to a load utilizing the electric power of a storage-battery-equipped vehicle is described in Patent Document 1. The power supply device described in Patent Document 1 is included in a storage-battery-equipped vehicle, and therefore, it is possible to supply electricity to a load (e.g., an electric appliance) not only at home but also at a location away from home such as a camping site.

PRIOR ART DOCUMENT

Patent Document

Patent Document 1: Japanese Laid-Open Patent Publication No. 2014-64457

DISCLOSURE OF THE INVENTION

Problems to be Solved by the Invention

However, the power supply device described in Patent Document 1 is not capable of switching power sources, and therefore, even if there are a plurality of storage-battery-equipped vehicles or storage batteries, the load cannot be continuously supplied with electricity.

The present invention has been achieved under the above circumstances, with a problem thereof being to provide a power supply device capable of switching power sources and thereby continuously supplying electricity to a load.

Solution to the Problems

To solve the above problem, the present invention provides a power supply device including a plurality of vehicle connecting portions connected in a one-to-one relationship with a plurality of storage-battery-equipped vehicles, a load connecting portion connected to a load, a power supply portion for performing a charge operation to charge storage batteries of the storage-battery-equipped vehicles and a discharge operation to discharge the storage batteries, during which the load is supplied with electricity, a memory portion for storing the number of charges and discharges for each of the storage-battery-equipped vehicles, and a supply control portion for selecting a supply vehicle to serve as a power source from among the storage-battery-equipped vehicles at predetermined time intervals, whereby the power supply portion performs the discharge operation only on the supply vehicle, in which the supply control portion selects as the supply vehicle one of the storage-battery-equipped vehicles that satisfies a first condition that an SOC of the storage battery is greater than or equal to a prescribed value and a second condition that the number of charges and discharges is not the highest among the storage-battery-equipped vehicles.

This configuration includes the vehicle connecting portions connected in a one-to-one relationship with the storage-battery-equipped vehicles, and therefore, it is possible to switch power sources and thereby continuously supply electricity to a load. Further, in this configuration, selected as a supply vehicle is a vehicle that satisfies the first condition that the SOC of the storage battery is greater than or equal to a prescribed value and the second condition that the number of charges and discharges is not the highest, and therefore, it is possible to reserve a certain time period for supplying electricity and also prevent deterioration of any specific storage battery caused by charge and discharge.

In the power supply device, it is preferable that the supply control portion selects as the supply vehicle one of the storage-battery-equipped vehicles that satisfies, in addition to the first and second conditions, a third condition that a connection to the vehicle connecting portion has a temperature lower than a preset temperature.

This configuration renders it possible to prevent the temperature of a connection (e.g., a connector portion of the storage-battery-equipped vehicle) to the vehicle connecting portion from rising excessively, with the result that the connection deteriorates or discharge from the storage battery is interrupted.

In the power supply device, it is preferable that the supply control portion determines whether the first, second, and third conditions are satisfied, in a predetermined order for the storage-battery-equipped vehicles, and thereby sets as the supply vehicle the first vehicle that is determined to satisfy the first, second, and third conditions.

In this configuration, only one vehicle is selected as the supply vehicle, and therefore, it is possible to prevent the temperature of any other vehicle, i.e., any non-supply vehicle, from rising at the connection. Further, in this configuration, only one storage battery is required to be discharged, and therefore, it is possible to simplify the control of the power supply portion when compared to the case where more than one storage battery is discharged.

In the power supply device, the supply control portion can be configured to perform processes at the time of supplying electricity, including a data acquisition process for obtaining data related to the SOC of the storage battery and data related to the temperature of the connection, a supply vehicle selection process for selecting the supply vehicle, and a supply process for controlling the discharge operation of the power supply portion.

The power supply device can be configured to further include a switching portion interposed between power lines that connect the vehicle connecting portions and the power supply portion, in which the switching portion under control of the supply control portion causes the power supply portion to be electrically conductive to the vehicle connecting portion that is connected to the supply vehicle but not to be electrically conductive to the vehicle connecting portion that is connected to a non-supply vehicle.

Effect of the Invention

The present invention makes it possible to provide a power supply device capable of switching power sources and thereby continuously supplying electricity to a load.

BRIEF DESCRIPTION OF THE DRAWINGS

FIG. 1 is a block diagram illustrating the configuration of a power supply device of the present invention.

FIG. 2 is a flowchart of supply control in the present invention.

FIG. 3 is a flowchart of a supply vehicle selection process in FIG. 2.

FIG. 4 is a flowchart of an allocation value calculation process in FIG. 3.

MODE FOR CARRYING OUT THE INVENTION

Hereinafter, an embodiment of a power supply device according to the present invention will be described with reference to the accompanying drawings.

FIG. 1 illustrates a power supply device 100 according to an embodiment of the present invention. In FIG. 1, solid lines between components of the power supply device 100 denote power lines, and dotted lines between the components denote communication lines (e.g., CAN communication lines).

The power supply device 100 includes a plurality (in the present embodiment, three) of vehicle connecting portions 1-1, 1-2, and 1-3, a load connecting portion 2, a power supply portion 3, a switching portion 4, a control portion 10, and a system connecting portion (not shown). The power supply device 100 utilizes the electric power of a power system connected to the system connecting portion to charge storage-battery-equipped vehicles A to C connected to the vehicle connecting portions 1-1, 1-2, and 1-3. Moreover, the power supply device 100 discharges the storage-battery-equipped vehicles A to C, and utilizes the discharged power to supply electricity to a load (not shown) connected to the load connecting portion 2.

The load is, for example, an electric appliance. The storage-battery-equipped vehicles A to C are, for example, electric cars equipped with rechargeable storage batteries. Note that charging the storage-battery-equipped vehicles A to C is intended to mean charging the storage batteries of the storage-battery-equipped vehicles A to C, and discharging the storage-battery-equipped vehicles A to C is intended to mean discharging the storage batteries of the storage-battery-equipped vehicles A to C.

The vehicle connecting portions 1-1, 1-2, and 1-3 are configured to be connected in a one-to-one relationship with connector portions TA, TB, and TC (corresponding to the "connections" of the present invention) of the storage-battery-equipped vehicles A to C. In FIG. 1, the vehicle connecting portion 1-1 is connected to the connector portion TA of the storage-battery-equipped vehicle A, the vehicle connecting portion 1-2 is connected to the connector portion TB of the storage-battery-equipped vehicle B, and the vehicle connecting portion 1-3 is connected to the connector portion TC of the storage-battery-equipped vehicle C. The vehicle connecting portions 1-1, 1-2, and 1-3 may be connectors in conformity with a single standard (e.g., the CHAdeMO standard) or different standards (e.g., the CHAdeMO standard for the vehicle connecting portions 1-1 and 1-2 and the SAE standard for the vehicle connecting portion 1-3). Note that one or more of the storage-battery-equipped vehicles A to C may be equipped with a portable storage battery having a connector portion.

The load connecting portion 2 is configured to be connectable to at least one load. More specifically, the load connecting portion 2 includes at least one receptacle into which the load is plugged.

For example, the power supply portion 3 includes a bidirectional DC/AC inverter and performs a charge operation for charging the storage-battery-equipped vehicles A to C and a discharge operation for discharging the storage-battery-equipped vehicles A to C. More specifically, the power supply portion 3 performs an AC/DC conversion operation as the charge operation to generate a direct-current voltage (e.g., DC 150V to 450V) from an inputted alternating-current voltage (e.g., AC 200V), and also performs a DC/AC conversion operation as the discharge operation to generate an alternating-current voltage (e.g., AC 200V) from an inputted direct-current voltage (e.g., DC 150V to 450V). The power supply portion 3 is connected at the alternating-current side to the load connecting portion 2 and the system connecting portion and at the direct-current side to the vehicle connecting portions 1-1, 1-2, and 1-3 via the switching portion 4.

The switching portion 4 is interposed between the power lines that connect the vehicle connecting portions 1-1, 1-2, and 1-3 and the power supply portion 3, and is configured to cause the power lines to switch between conductive and non-conductive states, under control of the control portion 10. The switching portion 4 consists of, for example, three relays operating under control of the control portion 10 and being interposed between the power lines that connect the vehicle connecting portions 1-1, 1-2, and 1-3 and the power supply portion 3. When the control portion 10 selects the storage-battery-equipped vehicle A as a source vehicle and the storage-battery-equipped vehicles B and C as non-source vehicles, the switching portion 4 causes the power line that connects the vehicle connecting portion 1-1 and the power supply portion 3 to be conductive and also causes the power lines that connect the vehicle connecting portions 1-2 and 1-3 and the power supply portion 3 to be non-conductive. As a result, the storage-battery-equipped vehicle A serves as a source vehicle (supply vehicle), and the storage-battery-equipped vehicles B and C serve as non-source vehicles (non-supply vehicles).

The control portion 10 includes a communication portion 11, a memory portion 12, and a supply control portion 13. The control portion 10 is, for example, a microcomputer. The control portion 10 communicates with the vehicle connecting portions 1-1, 1-2, and 1-3, the power supply portion 3, and the switching portion 4.

The communication portion 11 communicates with the storage-battery-equipped vehicles A to C via the vehicle connecting portions 1-1, 1-2, and 1-3 to obtain vehicle data and command data from the storage-battery-equipped vehicles A to C and temperature data for the connector portions TA to TC of the storage-battery-equipped vehicles A to C from the vehicle connecting portions 1-1, 1-2, and 1-3. The vehicle data includes, for example, data related to a vehicle code (manufacturer, vehicle type, standard, etc.), storage battery specifications (maximum capacity, upper and lower limits of discharge voltage, etc.), and the state of charge (SOC) remaining in the storage battery. The command data includes, for example, a charge-start command, a charge-stop command, a discharge-start command, and a discharge-stop command. Note that the vehicle data may include temperature data for the connector portions TA to TC. The communication portion 11 stores the vehicle data, the command data, and the temperature data in the memory portion 12 and outputs such data to the supply control portion 13.

The memory portion 12 stores the vehicle data and charge/discharge history data. The charge/discharge history data includes data related to the number of charges and discharges performed by the power supply portion 3 for each vehicle. In the present invention, the number of charges and discharges is, for example, the sum of the numbers of charges and discharges performed by the power supply portion 3 during a predetermined period of time (e.g., the most recent one-year period). In this case, the number of charges and discharges does not include the number of charges and discharges performed by devices other than the power supply portion 3, i.e., other than the power supply device 100. The charge/discharge history data is updated upon charge or discharge performed by the power supply portion 3. The data for the number of charges and discharges may be obtained from the vehicles. Moreover, the number of charges and discharges in the charge/discharge history data may include the number of charges and discharges performed by devices other than the power supply device 100, in addition to the number of charges and discharges performed by the power supply portion 3.

The supply control portion 13 controls the charge operation and the discharge operation of the power supply portion 3. For example, the supply vehicle attempts to output the maximum current that can be outputted at the time of supplying electricity, but if the maximum current is outputted, the connector portion, TA, TB, or TC, of the supply vehicle thermally deteriorates. Accordingly, in controlling the discharge operation of the power supply portion 3, the supply control portion 13 identifies the upper-limit temperature for the connector portion, TA, TB, or TC, on the basis of the vehicle data, and controls the output current of the supply vehicle (i.e., the input current of the power supply portion 3) such that the temperature of the connector portion, TA, TB, or TC, does not exceed the upper-limit temperature.

The supply control portion 13 also controls the switching portion 4. More specifically, on the basis of the state of charge (SOC) remaining in each of the storage batteries of the storage-battery-equipped vehicles A to C, the number of charges and discharges of each storage battery, and the temperatures of the connector portions TA to TC of the storage-battery-equipped vehicles A to C, the supply control portion 13 selects a supply vehicle, and performs source switching control to change the state of the switching portion 4 such that the power supply portion 3 performs the discharge operation only on the supply vehicle.

In the present embodiment, the supply control portion 13 performs the source switching control such that there is basically only one supply vehicle. The temperature of the connector portion, TA, TB, or TC, rises during the supplying of electricity and falls after the supplying of electricity stops. In the case where there is only one supply vehicle, when compared to the case where there is more than one supply vehicle, the rate of decrease in SOC per supply vehicle increases and the time of supplying electricity is saved, whereby the duration of the temperature rise is shortened for the connector portion, TA, TB, or TC, resulting in a reduced thermal burden. Moreover, in the case where there is only one supply vehicle, only one storage battery is required to be discharged, and therefore, when compared to the case where more than one storage battery is discharged, the supply control by the supply control portion 13 can be simplified.

Next, the supply control by the supply control portion 13 will be described with reference to FIGS. 2 to 4. The supply control includes the source switching control and the control of the discharge operation of the power supply portion 3. The following is based on the premise that the storage-battery-equipped vehicles A to C are connected to the vehicle connecting portions 1-1, 1-2, and 1-3.

As shown in FIG. 2, the supply control portion 13 starts supply control upon input of command data related to a discharge-start command. After starting the supply control, the supply control portion 13 performs a data acquisition process (S1). The data acquisition process is a process performed by the supply control portion 13 for obtaining vehicle data, charge/discharge history data, and temperature data.

After performing the data acquisition process, the supply control portion 13 starts a supply vehicle selection process (S2). The supply vehicle selection process will be described later. After starting the supply vehicle selection process, the supply control portion 13 further starts a supply process (S3). The supply process is a process for controlling the discharge operation of the power supply portion 3. Note that in the case where there is only one vehicle connected to any of the vehicle connecting portions 1-1, 1-2, and 1-3, the supply vehicle selection process is not performed, and only the supply process is started.

After starting the supply process, the supply control portion 13 determines whether to stop supplying electricity (S4). When command data related to a discharge-stop command has already been inputted, the supply control portion 13 determines to stop supplying electricity (YES in S4).

On the other hand, when command data related to a discharge-stop command has not yet been inputted, the supply control portion 13 determines not to stop supplying electricity (NO in S4) and performs the data acquisition process once again while continuing the supply vehicle selection process and the supply process (S1). From the second data acquisition process onward, the supply control portion 13 is simply required to obtain data related to the SOC of each storage battery and temperature data of the connector portions TA to TC.

After performing the data acquisition process, the supply control portion 13 performs a supply vehicle selection process (S2) and a supply process (S3) on the basis of data obtained anew. For example, in the case where the supply vehicle is switched from the storage-battery-equipped vehicle A to the storage-battery-equipped vehicle B as a result of the supply vehicle selection process, the supply control portion 13 changes control conditions for the supply process on the basis of the vehicle data related to the storage-battery-equipped vehicle B (e.g., storage battery specifications, the upper-limit temperature for the connector portion TB, etc.).

FIG. 3 illustrates a flowchart of the supply vehicle selection process (S2).

As shown in the figure, after starting the supply vehicle selection process, the supply control portion 13 determines whether allocation values have already been set for the vehicle connecting portions 1-1, 1-2, and 1-3 (S11). Here, the allocation values for the vehicle connecting portions 1-1, 1-2, and 1-3 refer to values allocated for the vehicle connecting portions 1-1, 1-2, and 1-3 inputting discharged power to the power supply portion 3. For example, in the case where only the discharged power from the storage-battery-equipped vehicle A is inputted to the power supply portion 3, the allocation value is 100% for the vehicle connecting portion 1-1 and also 0% for both the vehicle connecting portions 1-2 and 1-3. On the other hand, in the case where discharged power is uniformly inputted from the storage-battery-equipped vehicles A and B, the allocation value is 50% for both the vehicle connecting portions 1-1 and 1-2 and also 0% for the vehicle connecting portion 1-3.

In the case where no allocation values have yet been set for the vehicle connecting portions 1-1, 1-2, and 1-3 (NO in S11), the supply control portion 13 determines whether to execute the source switching control (S12). The user can set in advance whether to execute the source switching control.

In the case where the source switching control is not executed (NO in S12), the supply control portion 13 performs a default allocation process (S13) and determines once again whether allocation values have already been set for the vehicle connecting portions 1-1, 1-2, and 1-3 (S11). The default allocation process is a process performed by the supply control portion 13 for resetting the allocation values for the vehicle connecting portions 1-1, 1-2, and 1-3 to default. By default, the allocation values for the vehicle connecting portions 1-1, 1-2, and 1-3 are, for example, 33%. That is, in the case where the default allocation process is performed, the vehicle connecting portions 1-1, 1-2, and 1-3 uniformly output discharged power.

In the case where the source switching control is executed (YES in S12), the supply control portion 13 performs an allocation value calculation process (S14). The allocation value calculation process will be described later. After performing the allocation value calculation process, the supply control portion 13 determines once again whether allocation values have already been set for the vehicle connecting portions 1-1, 1-2, and 1-3 (S11).

In the case where the allocation values for the vehicle connecting portions 1-1, 1-2, and 1-3 have already been set (YES in S11), the supply control portion 13 performs a process for clearing the allocation values (by returning the values to the NOT SET status; S15), and determines once again whether allocation values have already been set for the vehicle connecting portions 1-1, 1-2, and 1-3 (S11). Note that the process for returning the allocation values to the NOT SET status (S15) may be performed only when a predetermined period of time (e.g., 1 second) has passed after the setting of the allocation values.

FIG. 4 illustrates a flowchart of the allocation value calculation process (S14).

As shown in the figure, the allocation values are set as allocation value 1 or 2 for the vehicle connecting portion 1-1, allocation value 3 or 4 for the vehicle connecting portion 1-2, and allocation value 5 or 6 for the vehicle connecting portion 1-3. In the present embodiment, allocation values 1, 3, and 5 are set at 100%, and allocation values 2, 4, and 6 are set at 0%.

After starting the allocation value calculation process, the supply control portion 13 performs a first determination for the vehicle connecting portion 1-1 (S21). As the first determination, the supply control portion 13 determines whether the following conditions are satisfied:

(1) a first condition that the state of charge SOC1 remaining in the storage battery of the storage-battery-equipped vehicle A is greater than or equal to a first prescribed value (e.g., 60%);

(2) a second condition that the number of charges and discharges N1 for the storage-battery-equipped vehicle A is not the highest among the storage-battery-equipped vehicles A to C;

(3) a third condition that the temperature T1 of the connector portion TA of the storage-battery-equipped vehicle A is lower than a first preset temperature (e.g., 42° C.)

Satisfying the first condition makes it possible to prevent the situation where discharge is interrupted prematurely resulting from the remaining storage battery charge SOC1 being low. In other words, satisfying the first condition makes it possible to reserve a certain time period for supplying electricity. Satisfying the second condition makes it possible to prevent the number of charges and discharges from increasing only for the storage-battery-equipped vehicle A among the storage-battery-equipped vehicles A to C, with the result that only the storage battery of the storage-battery-equipped vehicle A deteriorates. Satisfying the third condition makes it possible to prevent the temperature T1 of the connector portion TA of the storage-battery-equipped vehicle A from rising excessively, with the result that the connector portion TA deteriorates or discharge is interrupted. Note that in the case where the temperature T1 of the connector portion TA rises excessively, the storage-battery-equipped vehicle A outputs a discharge-stop command to the power supply device 100, and therefore, if it is tolerable to stop discharge (or to stop supplying electricity), the determination as to whether the third condition is satisfied may be omitted in the first determination and also in second and third determinations to be described later.

The remaining storage battery charge SOC1 and remaining storage battery charges SOC2 and SOC3 to be described later are included in the vehicle data obtained by the data acquisition process (S1). The number of charges and discharges N1 and the numbers of charges and discharges N2 and N3 to be described later are included in the charge/discharge history data stored in the memory portion 12. The temperature T1 of the connector portion TA and the temperatures T2 and T3, to be described later, of the connector portions TB and TC are included in the temperature data obtained by the data acquisition process (S1). The first prescribed value and the first preset temperature are pre-stored in the memory portion 12 along with a second prescribed value, a second preset temperature, a third prescribed value, and a third preset temperature, which will be described later.

In the case where the first determination is that all of the first through third conditions are satisfied (YES in S21), the supply control portion 13 sets allocation value 1 (100%) for the vehicle connecting portion 1-1, allocation value 4 (0%) for the vehicle connecting portion 1-2, and allocation value 6 (0%) for the vehicle connecting portion 1-3 (S22), and then ends the allocation value calculation process (S14).

Furthermore, in addition to setting the allocation values (S22), the supply control portion 13 also controls the switching portion 4 such that the power lines that connect the vehicle connecting portion 1-1 and the power supply portion 3 are conductive and the power lines that connect the vehicle connecting portions 1-2 and 1-3 and the power supply portion 3 are not conductive. As a result, the storage-battery-equipped vehicle A serves as a source vehicle (supply vehicle), and the storage-battery-equipped vehicles B and C serve as non-source vehicles (non-supply vehicles).

In the case where the first determination is that one or more of the first through third conditions is not satisfied (NO in S21), the supply control portion 13 sets allocation value 2 (0%) for the vehicle connecting portion 1-1 (S23), and performs a second determination for the vehicle connecting portion 1-2 (S24).

As the second determination, the supply control portion 13 determines whether the following conditions are satisfied:

(1) a first condition that the state of charge SOC2 remaining in the storage battery of the storage-battery-equipped vehicle B is greater than or equal to a second prescribed value (e.g., 60%);

(2) a second condition that the number of charges and discharges N2 for the storage-battery-equipped vehicle B is not the highest among the storage-battery-equipped vehicles A to C;

(3) a third condition that the temperature T2 of the connector portion TB of the storage-battery-equipped vehicle B is lower than a second preset temperature (e.g., 42° C.)

In the case where the second determination is that all of the first through third conditions are satisfied (YES in S24), the supply control portion 13 sets allocation value 3 (100%) for the vehicle connecting portion 1-2 and allocation value 6 (0%) for the vehicle connecting portion 1-3 (S25), and then ends the allocation value calculation process (S14).

Furthermore, in addition to setting the allocation values (S25), the supply control portion 13 also controls the switching portion 4 such that the power lines that connect the vehicle connecting portion 1-2 and the power supply portion 3 are conductive and the power lines that connect the vehicle connecting portions 1-1 and 1-3 and the power supply portion 3 are not conductive. As a result, the storage-battery-equipped vehicle B serves as a source vehicle (supply vehicle), and the storage-battery-equipped vehicles A and C serve as non-source vehicles (non-supply vehicles).

In the case where the second determination is that one or more of the first through third conditions is not satisfied (NO in S24), the supply control portion 13 sets allocation value 4 (0%) for the vehicle connecting portion 1-2 (S26), and performs a third determination for the vehicle connecting portion 1-3 (S27).

As the third determination, the supply control portion 13 determines whether the following conditions are satisfied:

(1) a first condition that the state of charge SOC3 remaining in the storage battery of the storage-battery-equipped vehicle C is greater than or equal to a third prescribed value (e.g., 60%);

(2) a second condition that the number of charges and discharges N3 for the storage-battery-equipped vehicle C is not the highest among the storage-battery-equipped vehicles A to C;

(3) a third condition that the temperature T3 of the connector portion TC of the storage-battery-equipped vehicle C is lower than a third preset temperature (e.g., 42° C.)

In the case where the third determination is that all of the first through third conditions are satisfied (YES in S27), the supply control portion 13 sets allocation value 5 (100%) for the vehicle connecting portion 1-3 (S28), and then ends the allocation value calculation process (S14).

Furthermore, in addition to setting the allocation values (S28), the supply control portion 13 also controls the switching portion 4 such that the power lines that connect the vehicle connecting portion 1-3 and the power supply portion 3 are conductive and the power lines that connect the vehicle connecting portions 1-1 and 1-2 and the power supply portion 3 are not conductive. As a result, the storage-battery-equipped vehicle C serves as a source vehicle (supply vehicle), and the storage-battery-equipped vehicles A and B serve as non-source vehicles (non-supply vehicles).

In the case where the third determination is that one or more of the first through third conditions is not satisfied (NO in S27), the supply control portion 13 sets allocation value 6 (0%) for the vehicle connecting portion 1-3 (S29), and then ends the allocation value calculation process (S14). In this case, no electricity is supplied to the load.

In the allocation value calculation process (S14) of the present embodiment, the first determination for the vehicle connecting portion 1-1 is initially performed (S21), then the second determination for the vehicle connecting portion 1-2 is performed (S24), and lastly, the third determination for the vehicle connecting portion 1-3 is performed (S27), but the user can suitably change the determination order. More specifically, the supply control portion 13 determines whether the first, second, and third conditions are satisfied, in an order set in advance by the user for the storage-battery-equipped vehicles A to C, and the first vehicle that is determined to satisfy the first, second, and third conditions is selected as a supply vehicle. For example, among the vehicle connecting portions 1-1, 1-2, and 1-3, if the vehicle connecting portion 1-3 is used most frequently and the vehicle connecting portion 1-1 is used least frequently, the first through third determinations may be performed in the order: initially, the third determination for the vehicle connecting portion 1-3, then, the second determination for the vehicle connecting portion 1-2, and lastly, the first determination for the vehicle connecting portion 1-1.

Conclusively, since the power supply device 100 according to the present embodiment includes the vehicle connecting portions 1-1, 1-2, and 1-3 connected in a one-to-one relationship with the storage-battery-equipped vehicles A to C, it is possible to switch power sources and thereby continuously supply electricity to the load. Moreover, the power supply device 100 according to the present embodiment selects as a supply vehicle the vehicle that satisfies the first condition that the SOC of the storage battery is greater than or equal to a prescribed value (e.g., 60%), the second condition that the number of charges and discharges is not the highest, and the third condition that the temperature of the connector portion, TA, TB, or TC, is lower than a preset temperature (e.g., 42° C.), and therefore, it is possible to reserve a certain time period for supplying electricity, prevent the number of charges and discharges from varying among the storage-battery-equipped vehicles A to C, and further, prevent thermal deterioration of the connector portions TA to TC.

While one embodiment of the power supply device according to the present invention has been described above, the present invention is not limited to the embodiment.

The power supply device 100 according to the embodiment includes the three vehicle connecting portions 1-1, 1-2, and 1-3, but the power supply device according to the present invention is simply required to include two or more vehicle connecting portions.

The power supply device 100 according to the embodiment includes the switching portion 4, but the switching portion 4 can be omitted, for example, so long as the vehicle connecting portions 1-1, 1-2, and 1-3 can cause the power supply portion 3 to be electrically conductive to the source vehicle but not to the non-source vehicles.

In the embodiment, the control portion 10 consists of the communication portion 11, the memory portion 12, and the supply control portion 13, but the configuration can be changed suitably so long as discharge control is performed such that the power supply portion 3 performs the discharge operation only on a selected supply vehicle and the source switching control is performed on the basis of the SOC of each storage battery and the numbers of charges and discharges performed by the power supply portion 3. For example, the supply control portion 13 may have the function of either the communication portion 11 or the memory portion 12, or both, or the supply control portion 13 may be divided into a section for controlling the charge and discharge operations of the power supply portion 3 and a section for performing the source switching control.

In the embodiment, the supply control portion 13 performs the source switching control in the allocation value calculation process (S14) such that there is always only one source vehicle, but there may be more than one source vehicle. For example, in FIG. 4, the setting may be made such that allocation value 1 is 100%, allocation value 3 is 90%, allocation value 5 is 80%, and allocation values 2, 4, and 6 are 10%. On the other hand, by setting the allocation values such that there is always only one source vehicle, it is rendered possible to switch among the vehicle connecting portions 1-1, 1-2, and 1-3 and select the vehicle connecting portion that satisfies the determination conditions, whereby simple supply control allows the load to be continuously supplied with electricity.

DESCRIPTION OF THE REFERENCE CHARACTERS

1-1, 1-2, 1-3 vehicle connecting portion
2 load connecting portion
3 power supply portion
4 switching portion
10 control portion
11 communication portion
12 memory portion
13 supply control portion
100 power supply device

The invention claimed is:

1. A power supply device comprising:
   a plurality of vehicle connecting portions connected in a one-to-one relationship with a plurality of storage-battery-equipped vehicles;
   a load connecting portion connected to a load;
   a power supply portion for performing a charge operation to charge storage batteries of the storage-battery-equipped vehicles and a discharge operation to discharge the storage batteries, during which the load is supplied with electricity;
   a memory portion for storing the number of charges and discharges for each of the storage-battery-equipped vehicles; and
   a supply control portion for selecting a supply vehicle to serve as a power source from among the storage-battery-equipped vehicles at predetermined time intervals, whereby the power supply portion performs the discharge operation only on the supply vehicle, wherein,
   the supply control portion selects as the supply vehicle one of the storage-battery-equipped vehicles that satisfies a first condition that a state of charge (SOC) of the storage battery is greater than or equal to a prescribed value and a second condition that the number of charges and discharges is not the highest among the storage-battery-equipped vehicles,
   wherein the supply control portion selects as the supply vehicle one of the storage-battery-equipped vehicles that satisfies, in addition to the first and second conditions, a third condition that a connection to the vehicle connecting portion has a temperature lower than a preset temperature,
   wherein the supply control portion determines whether the first, second, and third conditions are satisfied, in a predetermined order for the storage-battery-equipped vehicles, and thereby sets as the supply vehicle the first vehicle that is determined to satisfy the first, second, and third conditions, and
   wherein only one vehicle is selected as the supply vehicle.

2. The power supply device according to claim 1, wherein the supply control portion performs processes at the time of supplying electricity, including:
   a data acquisition process for obtaining data related to the SOC of the storage battery and data related to the temperature of the connection;
   a supply vehicle selection process for selecting the supply vehicle; and
   a supply process for controlling the discharge operation of the power supply portion.

3. The power supply device according to claim 1, further comprising a switching portion interposed between power lines that connect the vehicle connecting portions and the power supply portion, wherein,
   the switching portion under control of the supply control portion causes the power supply portion to be electrically conductive to the vehicle connecting portion that is connected to the supply vehicle but not to be electrically conductive to the vehicle connecting portion that is connected to a non-supply vehicle.

4. The power supply device according to claim 1, wherein only the one vehicle is selected as the supply vehicle, such that only one storage battery is discharged.

* * * * *